United States Patent [19]

Stace

[11] Patent Number: 4,513,709
[45] Date of Patent: Apr. 30, 1985

[54] INTERNAL COMBUSTION ENGINE AND CYLINDER HEAD THEREFOR

[75] Inventor: Richard J. L. Stace, Southend-On-Sea, England

[73] Assignee: Ford Motor Company, Dearborn, Mich.

[21] Appl. No.: 442,195

[22] PCT Filed: Feb. 26, 1982

[86] PCT No.: PCT/GB82/00065
§ 371 Date: Oct. 14, 1982
§ 102(e) Date: Oct. 14, 1982

[87] PCT Pub. No.: WO82/02924
PCT Pub. Date: Sep. 2, 1982

[30] Foreign Application Priority Data

Feb. 27, 1981 [GB] United Kingdom ............ 8106324

[51] Int. Cl.³ ............................................. F02B 31/00
[52] U.S. Cl. ................................. 123/306; 123/193 M
[58] Field of Search ........... 123/193 R, 193 P, 193 M, 123/306

[56] References Cited

U.S. PATENT DOCUMENTS 1,733,696 10/1929 Ricardo ............................. 123/306
1,866,703 7/1932 Gehres ............................. 123/306
4,354,463 10/1982 Otani et al. ...................... 123/306

Primary Examiner—Craig R. Feinberg
Attorney, Agent, or Firm—Robert E. McCollum; Clifford L. Sadler

[57] ABSTRACT

An internal combustion engine has a cylinder head with a cardiodal recess with inlet and outlet apertures in which inlet and outlet valves are positioned. A cusp extending between the apertures imparts a swirling motion to gases entering the recess through the inlet aperture, but extends only about one third of the travel of the inlet valve so that it does not impede the flow of gases when the inlet valve is fully open.

3 Claims, 2 Drawing Figures

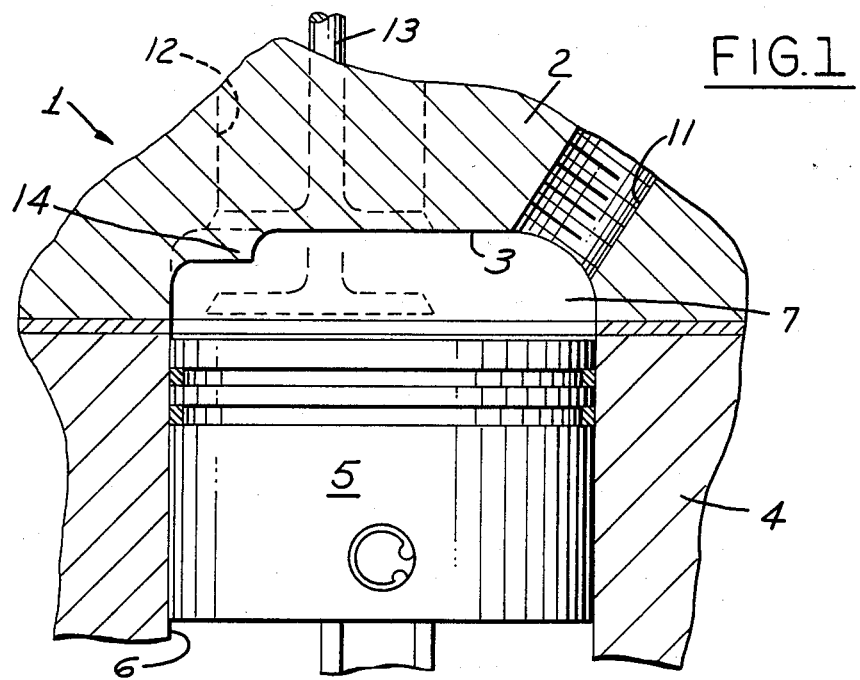
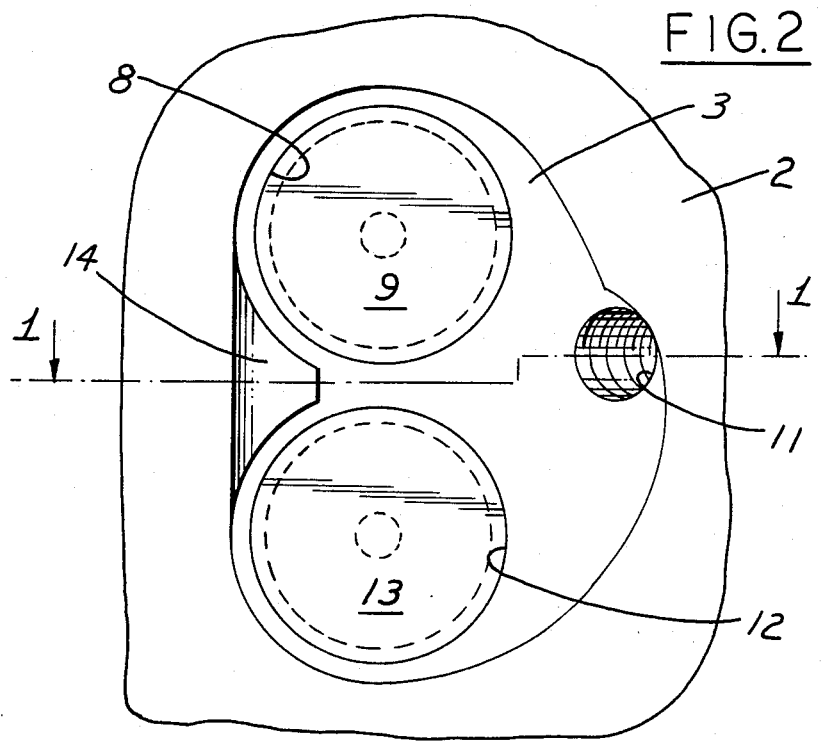

INTERNAL COMBUSTION ENGINE AND CYLINDER HEAD THEREFOR

DESCRIPTION

This invention relates to internal combustion engines, and cylinder heads therefor.

Conventional internal combustion engines comprise a cylinder head having a recess therein, a cylinder block having a piston reciprocable in an open-ended cylinder therein, the cylinder being positioned to register with the recess in the head to define a combustion chamber, and inlet and outlet valves mounted in valve openings in the recess for axial movement relative to the cylinder head to open and close the valve openings.

It is known to shape the recess e.g. by forming a cusp in one side wall, which projects between the inlet and outlet valves along the range of movement of the inlet valve so as to impart a swirling motion to gases flowing into the combustion chamber through the inlet valve. The swirling motion assists in mixing fuel and air within the combustion chamber and improves combustion.

However, we have observed that such cusps also restrict the free flow of gases into the chamber and therefore reduce the maximum amount of gas which can be drawn into the combustion chamber. The maximum power of the engine is therefore reduced.

According to the present invention, there is provided a cylinder head for an internal combustion engine comprising a recess for cooperating with a piston and cylinder in a cylinder block to define a combustion chamber and inlet and outlet apertures for seating inlet and outlet valves, the walls of the recess around the inlet aperture being shaped to impart a swirling action to gases flowing therethrough into the chamber, characterised in that the walls of the recess around the inlet aperture are shaped to impart the swirling action only when the inlet valve is partially open.

Since the walls of the recess are shaped to impart the swirling action only when the inlet valve is partially open, e.g. from one quarter to one half open, gases can flow more freely into the recess when the inlet valve is fully open. Consequently a smaller reduction in maximum power of the engine is achieved. Nevertheless the swirling action imparted to the gases whilst the inlet valve is partially open is sufficient to improve the combustion in the engine.

In the preferred embodiment of the invention, the swirling action is produced by a cusp on one side of the recess which projects radially across the recess between the inlet and outlet apertures, but extends axially from the inlet aperture a distance less than the axial movement of the inlet valve between its open and closed positions. Preferably the distance by which the cusp extends beyond the inlet aperture is no more than half, but preferably at least one quarter of the axial movement of the inlet valve between its open and closed positions.

The invention also includes an internal combustion engine incorporating a cylinder head in accordance with the invention.

A preferred embodiment of the invention will now be described, by way of example only with reference to the accompanying drawings, in which:

FIG. 1 is a vertical cross-section through part of an internal combustion engine in accordance with the invention;

FIG. 2 is a bottom view of a cylinder head incorporated in the engine of FIG. 1.

Referring to the drawings, an internal combustion engine 1 comprises a cylinder head 2 having a number of cardiodal recesses, one of which is shown at 3, in its lower surface, secured to a cylinder block 4 having a similar number of pistons 5 and cylinders 6 therein each positioned to register with a respective one of the recesses 3. The space enclosed by the cylinder 6, piston 5 and recess 4 defines a combustion chamber 7. As best seen in FIG. 2, fuel and air mixture may be introduced into the combustion chamber 7 through an inlet aperture 8 which is opened and closed by movement of an inlet valve 9, between the two positions indicated in broken lines in FIG. 1. The fuel and air mixture can be ignited in the combustion chamber by a sparking plug (not shown) retained in a threaded bore 11 in the roof of the recess 3. The products of combustion may be exhausted from the combustion chamber 7 through an exhaust aperture 12, which is opened and closed by movement of an exhaust valve 13 in a conventional manner.

One side wall of the recess 4 includes a cusp 14 which projects between the inlet and outlet apertures 8, 12. As best seen in FIG. 1, the cusp extends axially downwardly from the inlet aperture in the roof of the recess 3 by a distance equal to about one third of the movement of the inlet valve 9 between its open and closed positions.

In use, when the inlet valve is fully open, air and fuel mixture is free to flow over the cusp 14 into the combustion chamber. As the inlet valve closes however, the air and fuel mixture is directed by the cusp 14 into a swirling motion in the combustion chamber so that the air and fuel is thoroughly mixed immediately prior to combustion.

As a result, the favourable effect of a swirling gas and fuel mixture on combustion is achieved with little adverse influence on the maximum rate of flow of gas into the combustion chamber.

I claim:

1. A cylinder head for an internal combustion engine having walls comprising a recess having an upper substantially planar wall and side walls for cooperating with a piston and cylinder in a cylinder block to define a combustion chamber, and inlet and outlet apertures for seating axially movable inlet and outlet valves, the walls of the recess around the inlet aperture having means axially extending below the planar wall to impart a swirling action to gases flowing from the inlet aperture into the chamber as the inlet valve reaches a partially open position, the means extending axially less than that of full axial movement of the inlet valve to eliminate the swirl imparted action to the gases when the inlet valve is fully open.

2. A cylinder head according to claim 1 wherein the means axially extending in said recess includes a cusp in one side thereof which projects radially across the recess between the inlet and outlet apertures to impart the swirling action.

3. A cylinder head according to claim 2 wherein said cusp has an axial extent from one half to one quarter of the full axial movement of the inlet valve.

* * * * *